Patented Mar. 23, 1943

2,314,365

UNITED STATES PATENT OFFICE 2,314,365

STABILIZING GLYCERIDE OILS

Sidney Musher, New York, N. Y., assignor to Musher Foundation, Incorporated, New York, N. Y., a corporation of New York No Drawing. Application October 30, 1942,
Serial No. 463,895

7 Claims. (Cl. 260—398.5)

The present invention relates to the stabilization of glyceride oils and particularly to the stabilization against oxidative deterioration of those glyceride oils which contain a large proportion of unsaturated glycerides.

It has been found that these oils are particularly oxidizable and that this deterioration is increased wherever the oils are subjected to high temperature deodorization during the refining process.

It has now been found that when such glyceride oils are heated to relatively high temperatures with combinations of phosphorus compounds and particularly phosphatides, phosphoproteins or phospholipins such as lecithin and cephalin or phosphoric acid or its salts on the one hand together with gum guaiac, instead of losing stability and becoming more subject to deterioration, the oils will become very stable and highly resistant to oxidative deterioration and rancidity.

The phosphorus compounds and the gum guaiac are used preferably in equal proportions. They may also be employed in relative proportions varying from about 1 part of the former and 10 parts of the latter to 10 parts of the former and 1 part of the latter and the combinations are dispersed in the glyceride oil which is then heated or they may be added to the oil during high heat treatment to develop marked antioxygenic effectiveness.

These phosphorus compounds and gum guaiac may be added separately to the oil to be stabilized or may first be mixed in combination and then added to the oil but in either case they are thoroughly dispersed in the oil and held dispersed in the oil while the oil is at an elevated temperature in excess of 250° F. and preferably at over 400° F.

The preferred combination of phosphatide and gum guaiac is a mixture of lecithin or phosphoric acid and gum guaiac, preferably in equal proportions by weight.

The lecithin may be obtained from any source but is preferably obtained from crude soya bean, corn or cottonseed oil by precipitations of the lecithin after expulsion or extraction of the oil from the soya beans, corn germs or cottonseed. The lecithin may be in its crude form or in substantially refined form when utilized for combination with hydroquinone and for dispersal in the oil at the elevated temperature to produce the stabilizing effect.

Instead of using the phosphorus compound such as the lecithin in substantially purified condition, it is also possible to use animal or vegetable materials which are high in phosphatide content and which contain 30% to 40% or more total phosphatide content against their solids weight, such as, for example, nerve tissue and brain tissue, or materials containing the same.

The combination is added in an amount of less than 5% and desirably less than 1%. As little as 0.005% to 0.1% will give highly desirable stabilizing results when the glyceride oils are treated in accordance with this invention.

After dispersing the combination of phosphatide and gum guaiac such as the combination of lecithin and gum guaiac in the oil, the oil is heated to an elevated temperature, desirably in in excess of 250° F. and preferably to between 325° F. and 450° F. for at least 15 to 30 seconds.

It has been found that merely melting a glyceride fat or oil, particularly where the glyceride is solid at room temperature, is not sufficient to give the desired effect and it is necessary to utilize an elevated temperature substantially above the melting point of the glyceride if it normally be solid at room temperature.

During the heating period, any residue which may become burnt or charred may be removed as by filtration or centrifuging from the body of the oil, as the stabilization of the oil will already have been effected.

The oil which has been heated with the combination will normally be darker as the result of the elevated temperature treatment. It, however, has been found that the original light color of the oil may be restored by a bleaching process as, for example, with fuller's earth or other decolorizing materials and still retaining a substantial enhancement in the stability of the oil.

The results of the present invention are particularly surprising since antioxidants are recognized as losing at least a portion of, and in most cases a major portion of their effectiveness when heated to elevated temperatures such as to 400° F. or more.

*Example I*

Bleached refined lard was treated by adding thereto and mixing therein 0.05% of a combination of equal parts by weight of gum guaiac and soya lecithin. The lard containing the combination was then heated to 400° F. for 30 seconds and allowed to cool. The lard was thereupon tested by bubbling air through a 20 cc. sample at 208° F. until rancidity as determined organoleptically and by peroxide values was observed. A sample of lard from the same lot to which 0.05% of the combination was added but without being subjected to the 400° F. heat treatment was similarly tested along with a sample of the original untreated lard and it was found that far greater stability was obtained by adding the combination before the heat treatment.

When combinations of these materials are added to oils and thoroughly dispersed in them and said oils are then heated to above 250° F. and more desirably from a temperature of 325° F. to 500° F. whereby they are frequently charred or burnt in the oils, an unusually high protection against oxidation is obtained.

The glyceride may, where desired, be bleached or otherwise refined after treatment at the elevated temperature with the combination, and a distinct enhancement of the antioxygenic effect will be obtained, such enhancement being far in excess of normal expectations.

Glyceride oil containing compositions may also be used and they may already contain the phosphatide fraction. It is not desirable for the heating to be conducted in a small body of the oil containing composition and that oil containing composition used as a base for addition to a larger body of the oil containing composition. The most desirable method is for the combination to be dispersed in the entire body of material to be stabilized, followed by subjecting the material to a high heat in order to produce the desired interaction or result.

Apparently a chemical reaction occurs between the components of the combination and the oil composition at the elevated temperature whereby the stabilization is effected, as this reaction does not appear to be related to ordinary negative oxidation catalysis by means of which antioxidants normally exercise activity.

The higher the temperature to which the oil containing the combination of, for example, gum guaiac and lecithin, is subjected, the greater the stabilizing action although the sharpest increase in stabilization is between about 300° F. and 450° F.

The heat treatments need not be prolonged, the enhanced antioxygenic effect being obtained in relatively short periods particularly where the higher temperatures are employed. Normally, the oil containing the combinations may merely be heated to the desired temperature and allowed to cool, being held at the high temperature for a period of 10 minutes or more.

The heat treatment will usually be carried out at atmospheric pressure but the use of super or sub-atmospheric pressures may also be employed with satisfactory results.

This process may be utilized in the treatment and stabilization of a wide variety of refined or crude glyceride oils such as the vegetable oils and fats including cottonseed oil, corn oil, peanut oil, linseed oil, soya bean oil, olive oil, etc., the animal oils and fats including lard, tallow, oleo oil, cod liver oil, halibut liver oil, mackerel oil, menhaden oil, herring oil, shark liver oil, butter, etc., the glyceride soap oils as well as the oil containing compositions.

Not only is the oil composition stabilized, but components thereof are also stabilized. For example, the vitamin A content of fish liver oil and other oils, the carotene of butter fat and similar substances associated with the oils which may be destroyed or reduced by oxidation are highly stabilized by this treatment.

This invention is, however, particularly beneficial in the treatment of those glycerides which contain large proportions of unsaturated fatty acids as the combinations appear to react more completely with these unsaturated oils at the elevated temperatures.

Although the component parts of the combinations or the combinations themselves may already have some antioxygenic effect when added to the glyceride oils and without the heat treatment, nevertheless such antioxidant power is very greatly increased and enhanced by heating the combination in the oil to over 250° F. and preferably to 325° F. to 450° F.

The stability of the treated oils will often be enhanced from 50% to 500% or more by the heat treatment in the presence of these combinations as compared to the stability which would be obtained by the addition of the combinations without the heat treatment described in this invention.

The most important features of the present invention reside in the fact that the added materials are not normally present in the oil to be stabilized and upon addition are thoroughly dispersed in such oil. The heat treatment is carried out for a sufficient length of time to increase the stability by usually not less than 50% over the stability of the unheated oil.

While the combination is dispersed in the oil at the elevated temperature of, say 400° F., superheated steam may, where desired, be continuously injected into the oil over a period as long as 4 to 6 hours and the objectionable flavors and odors originally present in the oil may be removed therefrom while the combination is exerting its enhanced antioxygenic effect.

It has been found particularly desirable for a small amount of the combination to be added to high fat containing animal products, heating at atmospheric or elevated pressures to temperatures of about 250° F. so that the glyceride oil or fat contained therein is released from the meat or fish animal product and a highly stabilized animal glyceride is obtained.

For example, to a kettle of hog fat containing 70% total glycerides may be added 0.02% of a combination of gum guaiac and lecithin against the weight of the hog fat and the combination placed in a steam kettle with steam being injected into the kettle to produce about 30 to 45 pounds pressure. After a 4 to 6 hour treatment, the pressure may be released and the rendered lard removed. The stability of the lard obtained in this manner will be much greater than if the combination had merely been added to the lard after rendering.

For example, when a small amount of a combination of gum guaiac and lecithin is added to hog fat and the hog fat containing the combination is then rendered at a temperature of 275° F. for 4 hours, the rendered lard removed from the rendering kettle has a far greater stability than where a proportionate amount of the combination is added to the lard after rendering and the improvement in stability is even greater than where the combination is added to the lard after rendering and the lard containing the combination is then heated to 275° F. for 4 hours. Apparently a further interaction takes place by adding the combination to the rendering kettle where the rendering is conducted at over 250° F. resulting in a most highly stabilized oil.

In a similar manner, a small amount of the combination may be added to the rendering kettle in the rendering of other meat and fish oils and fats including tallow, menhaden oil, herring oil, etc., or to the cooking kettles in the manufacture of fish meals, particularly high glyceride containing fish meals, and where the temperature is at least about 250° F., the desired interaction will result producing enhanced stabilization.

Where the glyceride oils are heated over long periods to temperatures over 250° F. and desirably to temperatures over 300° F., small amounts of the combination may be added to the oils at regular intervals of 5 to 20 hours. In this manner, the glycerides will be held in highly stabilized and non-rancid condition over very long periods.

In carrying out the above described high temperature treatment, it is important that the combination be uniformly dispersed or distributed throughout the body of the oil and that the heating be carried out with substantial exclusion of the atmosphere or without contact with air.

It is moreover desirable for the combination to be maintained in dispersed condition during the heat treatment and so that it will not tend to settle or conglomerate or be present in the form of large lumps or particles since in the latter case the fully desirable results of the present invention are not obtained.

The oil after treatment in accordance with the present invention will not be materially changed in its odor or flavor. The oil will, however, have a darker color which may be removed by subjecting it to a bleaching operation.

It has also been found that desirable results are obtained where the combination is mixed with the oil or materials containing the glyceride oil and then the oil is heated to a temperature of, say, from 250° F. to 500° F. under a reduced pressure, such as under a gas pressure less than 1 pound per square inch, to cause distillation of part or all of the glyceride oil composition and it has been observed that such distilled fraction is highly stable, and is also free of the combination which has served as the stabilizing agent at the elevated temperature of distillation.

After treatment of the glyceride oil with the combination at the elevated temperature, the unsaponifiable fraction may be removed as by alcoholic extraction and said unsaponifiable fraction utilized for addition to other oxidizable oils to protect them against oxidative deterioration.

The present application is a continuation in part of application Serial No. 348,826 filed July 31, 1940, and through said application contains the subject matter of applications, Serial No. 247,631, filed December 24, 1938; Serial No. 292,613, filed August 30, 1939, now Patent 2,198,208; Serial No. 260,898, filed March 10, 1939, now Patent 2,198,211; and Serial No. 304,945, filed November 17, 1938, now Patent 2,216,711.

Having described my invention, what I claim is:

1. A process of stabilizing glyceride oils subject to oxidative deterioration whereby they become less subject to such deterioration, which comprises adding thereto and dispersing therein a small amount of a phosphorus compound selected from the group consisting of the phosphatides, phosphoproteins, phospholipins, phosphoric acid and the salts of phosphoric acid and a small amount of gum guaiac, and heating to in excess of 250° F.

2. A process of stabilizing glyceride oils subject to oxidative deterioration whereby they become less subject to such deterioration, which comprises adding thereto and dispersing therein a small amount of a phosphorus compound selected from the group consisting of the phosphatides, phosphoproteins, phospholipins, phosphoric acid and the salts of phosphoric acid and a small amount of gum guaiac, and heating to in excess of 250° F. while the oils are under subatmospheric pressure.

3. A process of stabilizing glyceride oils subject to oxidative deterioration whereby they become less subject to such deterioration, which comprises adding thereto and dispersing therein a small amount of a combination of a phosphatide and gum guaiac, and heating to in excess of 250° F.

4. A process of stabilizing glyceride oils subject to oxidative deterioration whereby they become less subject to such deterioration, which comprises adding thereto and dispersing therein a small amount of a combination of lecithin and gum guaiac, and heating to in excess of 250° F.

5. A glyceride oil containing composition normally subject to oxidative deterioration carrying the reaction product of a phosphorus compound and gum guaiac in the oil, said phosphorus compound selected from the group consisting of the phosphatides, phosphoproteins, phospholipins, phosphoric acid and the salts of phosphoric acid, said reaction product having been formed by heating the combination in the oil to a temperature in excess of 250° F. whereby an enhanced antioxygenic effect is obtained.

6. A glyceride oil containing composition having a high proportion of unsaturated glycerides, said oil being subject to oxidative deterioration, said oil carrying the reaction product of a phosphorus compound and gum guaiac in the oil, said phosphorus compound selected from the group consisting of the phosphatides, phosphoproteins, phospholipins, phosphoric acid and the salts of phosphoric acid, said reaction product having been formed by heating the combination in the oil to a temperature in excess of 250° F. whereby an enhanced antioxygenic effect is obtained.

7. A glyceride oil containing composition normally subject to oxidative deterioration carrying the reaction product of a phosphatide and gum guaiac in the oil, said reaction product having been formed by heating the combination in the oil to a temperature in excess of 250° F. whereby an enhanced antioxygenic effect is obtained.

SIDNEY MUSHER.